US006445979B1

(12) United States Patent
Inoue et al.

(10) Patent No.: US 6,445,979 B1
(45) Date of Patent: Sep. 3, 2002

(54) OPERATION LINE TRACKING DEVICE USING SENSOR

(75) Inventors: Toshihiko Inoue; Mitsuhiro Okuda, both of Minamitsuru-gun; Akihiro Terada, Fujiyoshida, all of (JP)

(73) Assignee: Fanuc Ltd., Yamanashi (JP)

( * ) Notice: Subject to any disclaimer, the term of this patent is extended or adjusted under 35 U.S.C. 154(b) by 57 days.

(21) Appl. No.: 09/705,885

(22) Filed: Nov. 6, 2000

(30) Foreign Application Priority Data

Nov. 5, 1999 (JP) .......................................... 11-314686

(51) Int. Cl.$^7$ ............................................. G05B 15/00
(52) U.S. Cl. ...................... 700/258; 700/245; 700/249; 700/251; 700/252; 700/255; 700/248; 700/259; 318/565; 318/568.74; 318/574; 901/3; 901/46; 901/47; 701/28; 701/301
(58) Field of Search ........................ 700/79, 240, 245, 700/249, 252, 255, 258, 259, 251, 9; 318/574, 565, 568.24; 901/42, 46, 47, 3; 219/124.34, 125.11, 130.21; 701/28, 301; 702/179, 183

(56) References Cited

U.S. PATENT DOCUMENTS

| 4,638,227 A | * | 1/1987 | Katayama et al. .......... 318/565 |
| 4,675,502 A | * | 6/1987 | Haefner et al. ......... 219/124.34 |
| 4,904,911 A | * | 2/1990 | Toyoda et al. .............. 318/434 |
| 4,942,538 A | * | 7/1990 | Yuan et al. .................... 348/95 |
| 5,323,470 A | * | 6/1994 | Kara et al. .................. 348/169 |
| 5,402,801 A | * | 4/1995 | Taylor ......................... 348/169 |
| 5,410,469 A | * | 4/1995 | Sakamoto et al. .......... 128/898 |

(List continued on next page.)

FOREIGN PATENT DOCUMENTS

| JP | 64-40290 | 2/1989 | |
| JP | 5-253804 | 10/1993 | |
| JP | 08103869 | 4/1996 | ............ B23K/9/12 |
| JP | 08103870 | 4/1996 | ............ B23K/9/12 |
| JP | 8-118021 | 5/1996 | |
| JP | 9-29436 | 2/1997 | |

OTHER PUBLICATIONS

Emura et al., Wide–range trajectory measurement using CCD camera for small mobile robots, Internet/IEEE, 1995, pp. 655–660.*
Beccari et al., Vision–based line tracking and navigation in structured environments, Internet/IEEE, 1997, pp. 406–411.*
Tisdall e tal., Adaptive force control for the arm manipulator, Internet/IEEE, UNK, see entire document.*

*Primary Examiner*—William A. Cuchlinski, Jr.
*Assistant Examiner*—McDieunel Marc
(74) *Attorney, Agent, or Firm*—Staas & Halsey LLP

(57) ABSTRACT

An operation line tracking device for a robot for performing an operation with a tool mounted on the robot while tracking an operation line using a sensor wherein a detection failure of the sensor is restored by automatically changing or resetting a detecting condition of the sensor when the sensor fails in detecting the operation line. If a detection failure occurs for a cause of excessive or too small quantity of light impinged on light receiving elements of a laser sensor, a laser output intensity is automatically changed. If a detection failure occurs for a cause of basing of the quantity of the impinged light, an orientation of the laser sensor is automatically adjusted. If a detection failure occurs for a cause of biasing of position of the operation line in the visual field of the laser sensor, the position of the laser sensor is automatically adjusted. If a detection failure occurs for a cause of detection of an unexpected line, an algorithm for detecting the operation line is replaced with another one. Thus, the detecting condition is automatically changed or reset in accordance with the cause of the detection failure, and the tracking operation of the robot is automatically restarted.

30 Claims, 8 Drawing Sheets

U.S. PATENT DOCUMENTS

| | | | |
|---|---|---|---|
| 5,445,166 A | * 8/1995 | Taylor | 700/9 |
| 5,475,198 A | * 12/1995 | Burke et al. | 128/897 |
| 5,486,679 A | * 1/1996 | Hamura et al. | 219/124.34 |
| 5,624,588 A | * 4/1997 | Terawaki et al. | 219/125.1 |
| 5,695,500 A | * 12/1997 | Taylor et al. | 219/124.34 |
| 5,737,500 A | * 4/1998 | Seraji et al. | 606/130 |
| 5,859,934 A | * 1/1999 | Green | 382/128 |
| 5,887,122 A | * 3/1999 | Terawaki et al. | 700/258 |
| 5,976,156 A | * 11/1999 | Taylor et al. | 606/130 |
| 6,040,554 A | * 3/2000 | Terada et al. | 219/124.34 |
| 6,321,139 B1 | * 11/2001 | Terada et al. | 219/124.34 |

* cited by examiner

OPERATION LINE TRACKING DEVICE USING SENSOR

BACKGROUND OF THE INVENTION

1. Field of the Invention

The present invention relates to an operation line tracking device for an industrial robot to perform an operation with a tool mounted on the robot while moving the tool along an operation line detected by a sensor such as a laser sensor.

2. Description of the Related Art

There is known an industrial robot such as a welding robot for performing an operation such as a welding operation by detecting a position of an operation line formed on an object of the operation using a sensor such as a laser sensor and moving a tool mounted on the robot to track the detected operation line.

In the tracking of the operation line, if the sensor fails to detect the operation line to cause a detection error, an operator of the robot has to seek a cause of the detection error and take a countermeasure against the detection error for restarting the tracking operation. There is known from Japanese Patent Laid-pen Publications Nos. 8-103869 and 8-103870, a method of dealing with a detection error in which the detection of the operation line is automatically repeated for predetermined times when a detection error occurs, and if the detection of the operation line is successful, the detected operation line is tracked and if the operation line is not detected in the repeated detection of predetermined times, an indication of error is displayed.

In the above conventional art as disclosed in Japanese Patent Laid-Open Publications Nos. 8-403869 and 8-103870, the detection of the operation line is repeatedly carried out automatically under the same detecting condition and it needs an operator s service to change the detecting condition. In particular, according to the above technology, when the sensor fails to detect the operation line or the position of the detected operation line largely deviates from a taught operation line, it is determined that a detection error occurs. There is a certain cause of the detection error and thus the detection of the operation line scarcely succeeds by repeating the detection under the same detecting condition. Also, in the case where the position of the detected line largely deviates from that of the taught operation line, there is a certain cause of such case and it is hard to success in detection by repeating the detection of the operation line under the same detecting condition.

Thus, it has needed an operator to take a countermeasure against the detection error, so that efficiency of the automatic tracking operation performed by the robot is lowered. Specifically, an optimal detecting condition for detecting an operation line on workpieces varies depending on a surface condition and a shape of the workpieces. For example, a detection error may occur in various cases where a region of low reflectance exists on the surface of the workpiece or a region of high reflectance because of oil, etc. exists on the surface, variations of the position/posture of the workpiece is large, a scanning range of the sensor is too wide to detect an unexpected object to fail in detection, a shape of the workpiece changes to require a change of the detecting condition. In the above cases, a detection error can not be eliminated unless the detecting condition is changed. As discussed, the change of the detecting condition has been performed by an operator manually, requiring a number of processes for recovering the automatic operation, so that an efficiency of the automatic operation of the robot is lowered.

SUMMARY OF THE INVENTION

The present invention provides an operation line tracking device for a robot to perform an operation with a tool mounted on the robot while moving the tool along an operation line formed on an object of operation. According to one aspect of the present invention, the operation line tracking device comprises a detector to detect a position of the operation line with a sensor under a preset detecting condition; observing means to observe detection state of the operation line by the detector; and detecting condition changing means to automatically change or reset the preset detecting condition based on the detection state observed by the observing means.

According to another aspect of the present invention, the operation line tracking device comprises: a detector to detect a position of the operation line using a sensor mounted on the robot under a preset detecting condition; operation stopping means to stop the operation of the robot and the detection of the operation line when the detector fails to detect the operation line; detecting condition changing means to change or reset the preset detecting condition after the detection of the operation line is stopped; operation restarting means to restart the detection of the operation line under the changed or reset detecting condition, and restart the operation of the robot when the detector succeeds in detecting the operation line under the changed or reset detecting condition.

The sensor of the detector may comprise a laser sensor operating under a preset laser output intensity, and the detecting condition changing means may change or reset the preset laser output intensity.

The detecting condition changing means may change or reset a detecting orientation and/or a detecting position of the sensor with respect to the object of operation.

The detector may detect a position of the operation line using a preset operation line detection program, and the detecting condition changing means may change or reset the preset operation line detection program for another operation line detection program. In this case, the detecting condition changing means may have a memory storing operation line detection programs with different detection algorithms, and selects one of the operation line detection programs as the preset operation line detecting condition and selects an operation line detection program other than the preset operation line detection program after the detection of the operation line is stopped.

The sensor of the detector may comprise a visual sensor for sensing an image of the object of operation within a preset visual field and the detecting condition changing means changes or resets the preset visual field of the visual sensor. In this case, the sensor may have a laser beam scanner for scanning a preset scanning region on the object of operation, and the detecting condition changing means may change or reset the visual field by changing the preset scanning region.

The operation line tracking device of the present invention may comprises analyzing means to analyze a cause of a detection failure when the detector fails in detecting the operation line, and the detecting condition changing means may automatically change or reset the preset detecting condition in accordance with the cause of the detection failure analyzed by the analyzing means.

The operation restarting means may restart the operation of the robot at a preset position different form the stopped position of the operation of the robot.

An alarm message may be displayed on a display device when the detector fails in detecting the operation line for a predetermined time or times under the changed or reset detecting condition.

At least one of information on the occurrence of the detection failure, information on the stop position of the operation of the robot, information on the detecting conditions before and after the changing or resetting of the detecting condition is stored in a memory when the detection of the operation line is restarted, and the information stored in the memory may be displayed on the display device.

DETAILED DESCRIPTION OF THE PREFERRED EMBODIMENTS

Figure 1:
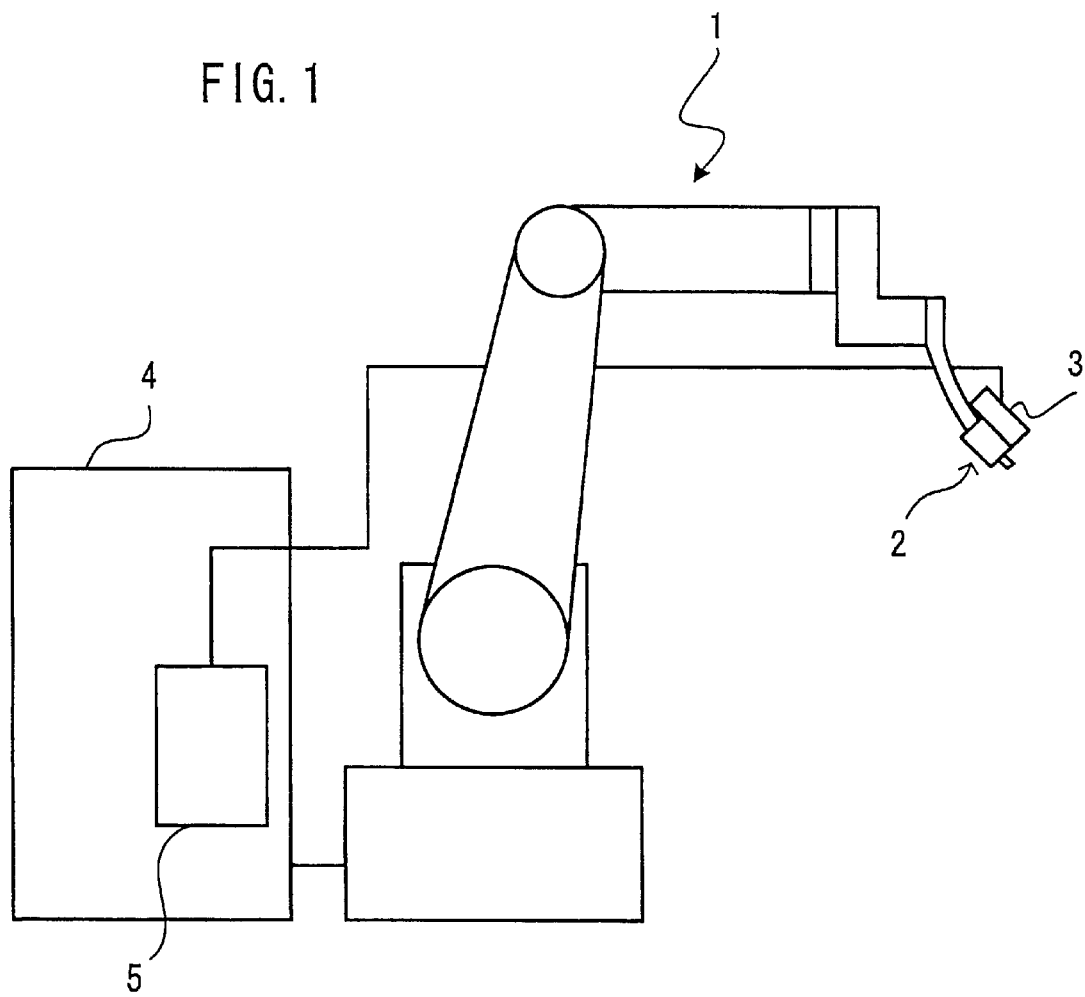
FIG. 1 is a schematic view of a welding robot system with an operation line tracking device according to an embodiment of the present invention.

FIG. 1 schematically shows a welding robot system to which an operation line tracing device of the present invention is applied. A welding torch 2 and a laser sensor 3 are attached to a wrist at a distal end of an arm of a robot 1. Servomotors for driving axes of respective joints of the robot 1 are controlled by a robot controller 4. A sensor board 5 is provided in the robot controller 4. On the sensor board 5, a control circuit for controlling the laser sensor 3 is mounted and electrically connected with the laser sensor 3 attached to the wrist of the robot arm. In this embodiment, the laser sensor 3 and the sensor board 5 constitutes a detector for detecting a position of a welding line formed on an object of welding operation.

A welding operation is performed on the basis of tealtime tracking in which the welding torch 2 is moved along the welding line detected by the detector using the laser sensor 3 in advance of the welding.

Figure 2:
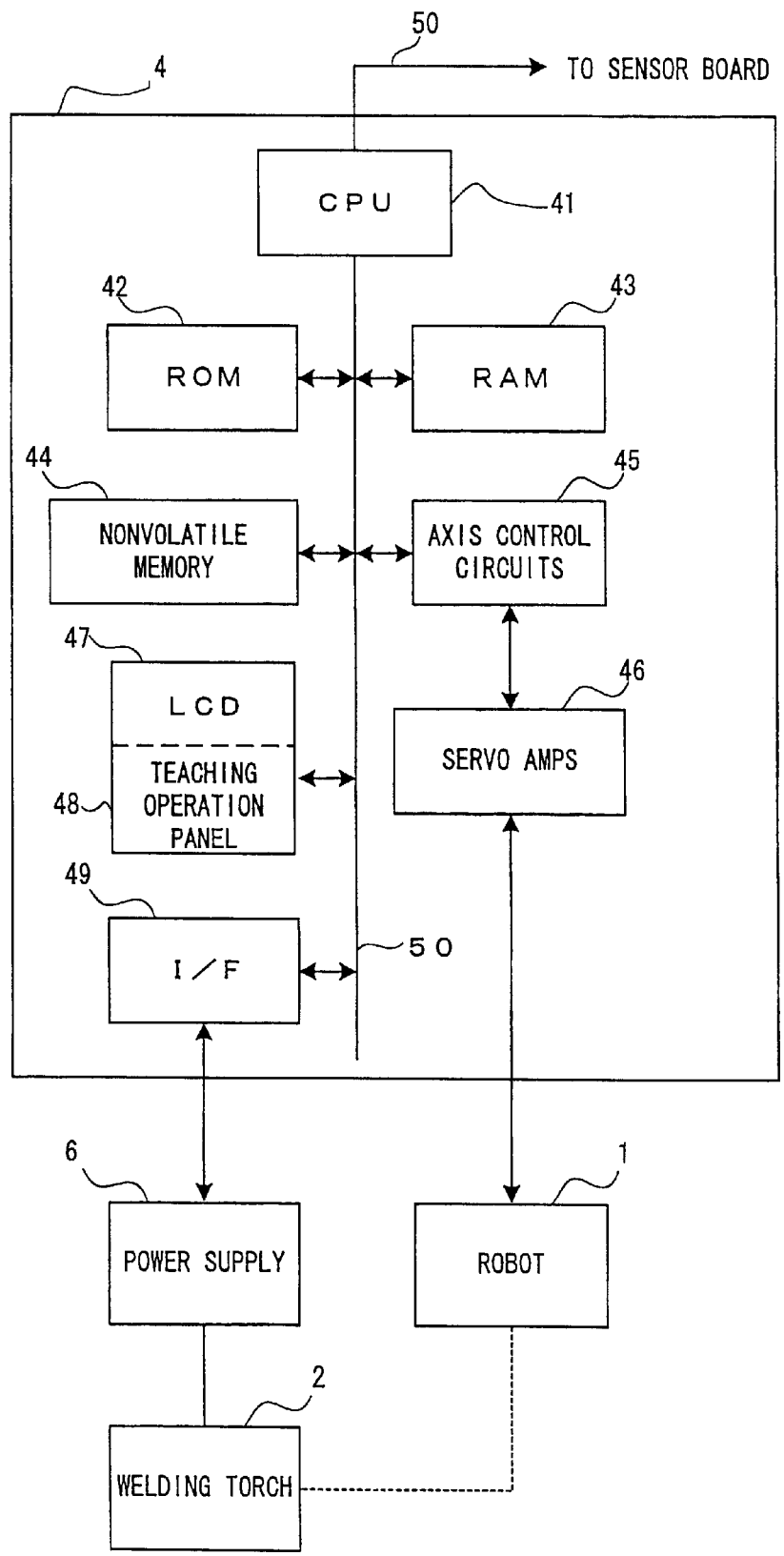
FIG. 2 is a block diagram showing a general configuration of the robot system shown in FIG. 1 including a robot, a welding torch and a robot controller.

FIG. 2 shows a basic configuration of the robot controller 4 in relation with the robot 1 and the welding torch 2. The robot controller 4 has a CPU 41 of a miro-processor which is connected with a CPU 51 of the sensor board 5 shown in FIG. 3 through a bus 50. The CPU 41 is connected through the bus 50 to a ROM 42, a RAM 43, a nonvolatile memory 44, a teaching operation panel 48 with a liquid-crystal display 47, axes controllers 45 connected to servomotors on the robot 1 through servo-amplifiers 46, and an interface 49 for a power supply 6 of the torch 2.

The ROM 42 stores a system program for generally controlling the whole system including respective components of the robot controller 4, the sensor board 5 and the power supply 6. The RAM 43 is used for temporary storage of computation data. The nonvolatile memory 44 is constituted by CMOS memory supported by a backup battery and stores set values of various parameters and taught programs for operating the robot 1 and the welding torch 2.

The CPU 41 issues a command for igniting the torch 2 under a predetermined power source condition to the power supply 6 through the interface 49 in accordance with the taught program stored in the nonvolatile memory 44, and issues a position detection command to the sensor board 5 and correct the taught positions designated by the taught program based on the detected position of the welding line transmitted from the sensor board 5 to output the corrected position as motion commands for respective axes to the axes controllers 45. The axes controllers 45 performs position/velocity loop control based on feedback signals from position/velocity detectors to drivingly control the servomotors for the respective axes so that a welding operation is performed while moving the torch along the detected welding line.

Figure 3:
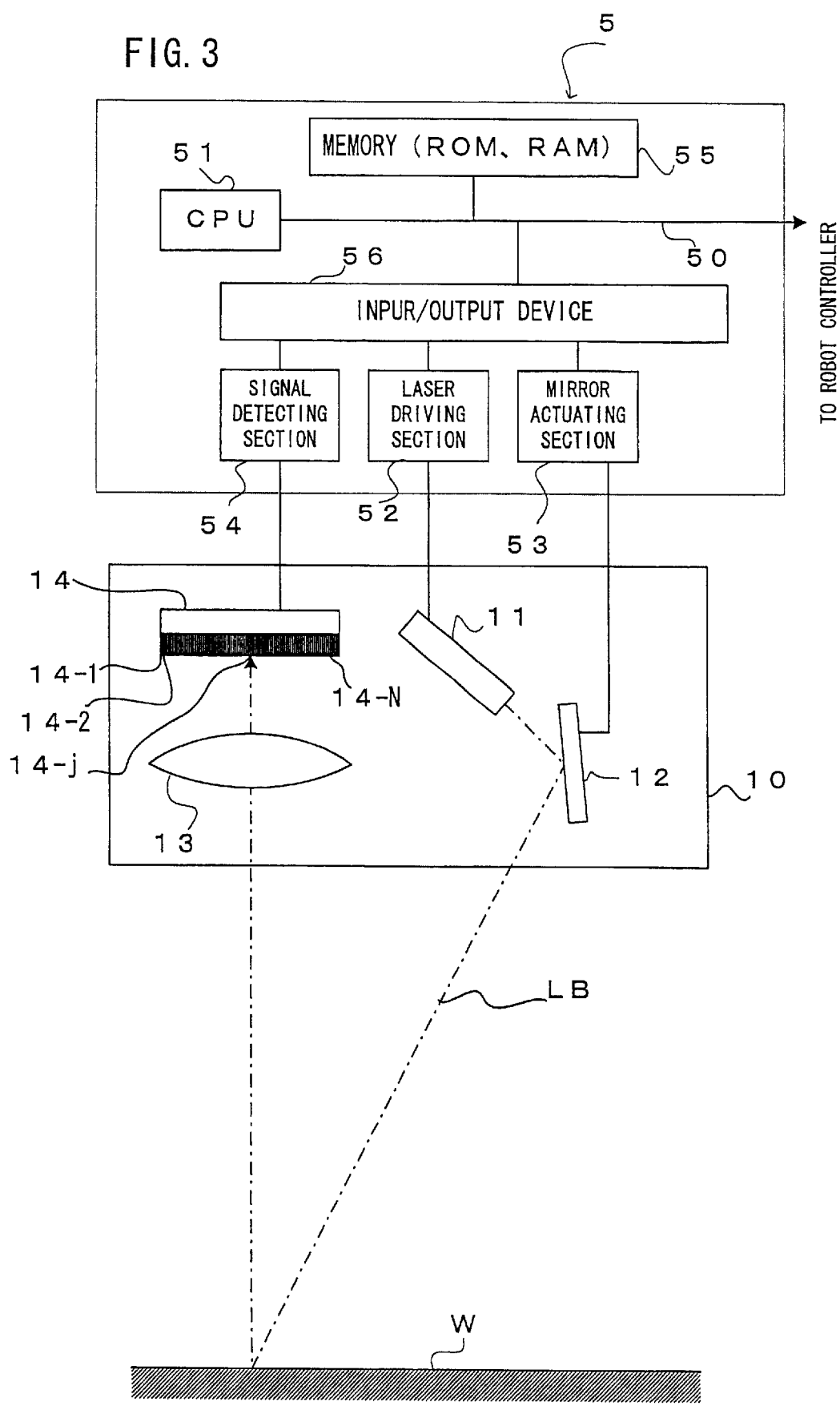
FIG. 3 is a block diagram schematically showing a laser sensor for use in the embodiment of the present invention.

FIG. 3 exemplifies a general structure of the position detector with the laser sensor 3 for use in this embodiment. A detecting section 10 has a laser oscillator 11, a swing mirror (galvanometer) 12 for scanning a laser beam LB outputted from the laser oscillator 11 and an optical system 13 for capturing a light reflected on a workpiece W to form an image on light-receiving elements 14. A controller on the sensor board 5 comprises a CPU 51 of a micro-processor. The CPU 51 is connected with an input/output interface 56, a memory 55 including ROM and RAM and the CPU 41 of the robot controller 4 through the bus 50.

The input/output device 56 is connected with a laser driving section 52 for driving the laser oscillator 11 to generate the laser beam LB, a mirror actuating section 53 for swinging a scanning mirror 12, and a signal detecting section 54 for detecting a position of an impinged light on the light receiving elements 14.

Upon receipt of a command to detect the position of the operation line from the robot controller 4, the CPU 51 starts a program for driving the laser sensor stored in the memory 55. The CPU 51 issues a laser driving signal to the laser driving section 52 to generate the laser beam LB and a mirror actuating signal to the mirror actuating section 53 to swing the scanning mirror 12 for scanning the workpiece W by the laser beam LB generated by the laser oscillator 11. The laser beam LB diffusely reflected on a workpiece W impinges on the light receiving elements 14 through the optical system 13 at a position in accordance with a reflection position on the workpiece W.

A linear array of CCD s (Charge Coupled Device) of light-receiving elements of a divided type, PSD (Position Sensitive Detector) of non-divided type laminated elements may be used as the light receiving elements 14. In this embodiment, a linear CCD array comprising a number of cells 14-1 to 14-$n$ is used as the light receiving elements 14.

The light impinged on any of the cells 14-1 to 14-$n$ is converted into photoelectron and stored in the cell. The electron stored in respective cells are outputted in order from the first cell 14-1 in response to a signal for scanning the CCD, and subjected by an A/D conversion to be stored and updated in the memory 55 through the signal detection section 54 and the input/output device 56. A scanning cycle of the CCD is set sufficiently shorter than a swinging cycle of the scanning mirror 12 and a scanning angle of the scanning mirror 12 and the corresponding signal outputting state of the CCD elements are recognized by the CPU 51. The outputting state of the CCD element 14 in respective CCD scanning cycles is recognized based on light detection output signals of respective cells 14-to 14-$n$. The position of the welding line formed as a recession line on the workpiece W is calculated based on the position of the cell outputting the light detection and a scanning angle of the laser beam LB by the scanning mirror 12, and the detected position of the welding line is transmitted to the robot controller 4.

The above basic constitution and operation of the robot 1 and the position detector using laser sensor 3 are substantially the same as the conventional one. According to the present invention, the detecting condition of the position detector is automatically changed or reset to eliminate a cause of a detection failure to continue the tracking operation, when the position detector fails to detect the welding line.

The cause of a detection failure of the welding line is considered to be a case where the welding line can not be detected because quantity of the impinged light on the light receiving elements 14 is excessive or too small depending on a surface condition of the workpiece, a case where the welding line can not be detected because an orientation of the detecting section 10 of the laser sensor 3 with respect to the workpiece W is not appropriate, a case where the welding line is positioned at peripheral region of a visual field of the sensor 3, and a case where the welding line can not be specified because an unexpected recession line is detected besides the welding line.

Figure 7:
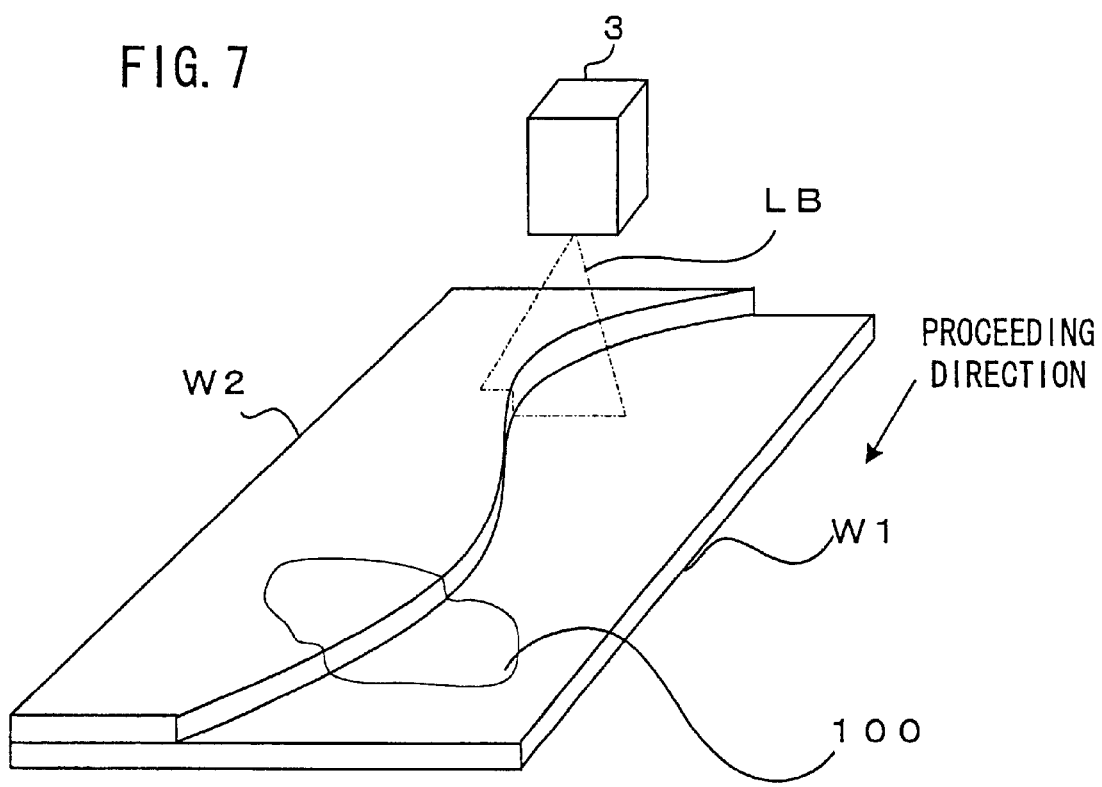
FIG. 7 is a schematic view showing a detection error because of excess of quantity of light impinged on the light receiving element.

FIG. 7 schematically shows a case where the quantity of light impinged on the light-receiving elements 14 is excessive. In the case where surfaces of workpieces W1 and W2 to be welded has a portion of high reflectance as a substantial mirror surface because of oil 100 on the surfaces, a halation occurs on the light receiving elements 14 in detection of a welding line formed as a recession line between the workpiece W1 and the workpiece W2 in this embodiment, to cause a detection error. In this case, the welding line can be detected by reducing an output of the laser oscillator 11 to eliminate the detection error.

Contrary to the above, in the case where a portion of low-reflectance exists on the workpieces to cause a detection error, such detection error can be eliminated by raising the output of the laser oscillator 11.

Conventionally, when a detection error occurs by any causes including the above mentioned causes, a restoring operation is carried out by an operator after the robot operation and the detection operation of the welding line are stopped. In the present invention, the operation line detection is automatically carried out again by changing or resetting the condition of the operation line detection and if the detection error is eliminated and the position of the operation line is detected, the operation of the robot is continued while performing tracking of the operation line.

Figure 8:
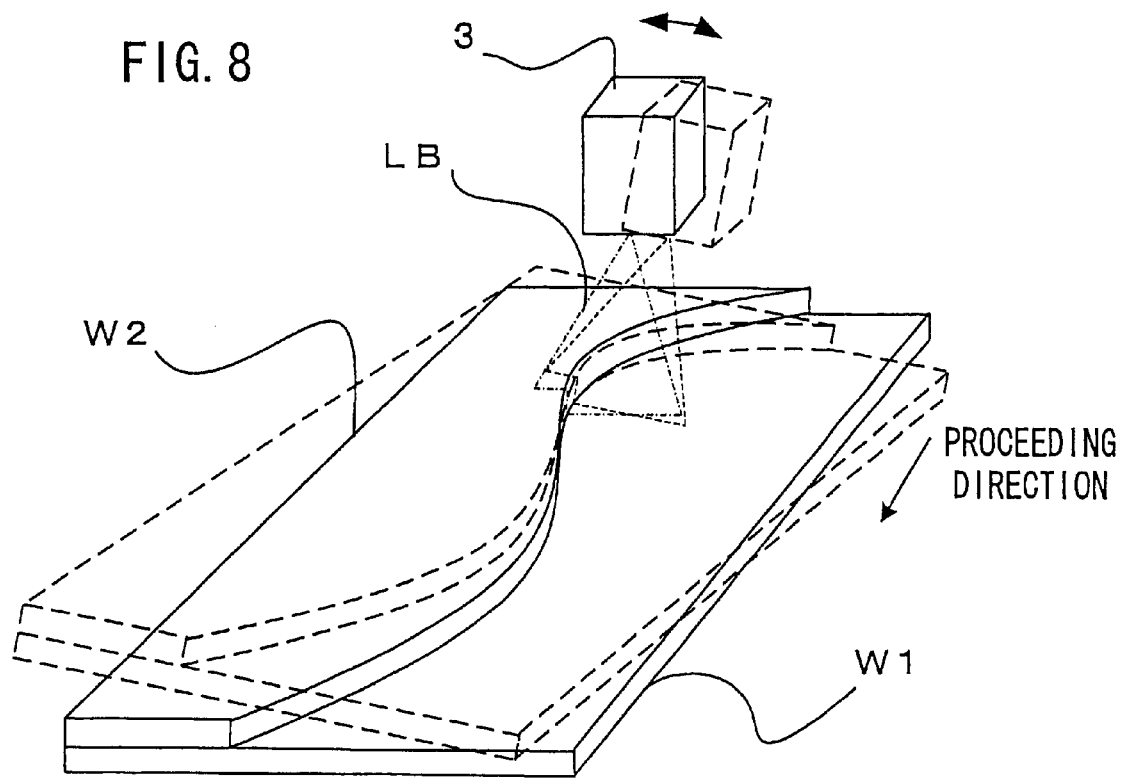
FIG. 8 is a schematic view showing a detection failure because of inappropriate orientation of the sensor with respect to a workpiece.

FIG. 8 schematically show a case where a detection error occurs because the workpieces W1 and W2 between which a welding line is formed are inclined with respect to the sensor 3. The workpiece W1 and W2 are positioned in normal condition as indicated by the solid line and the orientation of the laser sensor 3 is predetermined for detecting the welding line formed between the workpieces W1 and W2. When the workpieces W1 and W2 are inclined as shown by the dotted line for some reason, a detection error may occur to change the orientation of the sensor 3 with respect to the workpieces W1 and W2. In such case, the quantity of light impinged on the light receiving elements 14 is biased so that the quantity of light on one end of the light receiving elements 14 is made small to fail in detecting the welding line. In such case, the detection failure may be eliminated by changing an orientation of the sensor 3 to have a preset angle with respect to the workpieces W1 and W2. Specifically, if the quantity of light impinged on the left-hand portion of the light receiving elements 14 is small, it is determined that the workpieces W1 and W2 are inclined counterclockwise with respect to a proceeding direction of the welding operation, as shown by the dotted line, and therefore the sensor 3 should be rotated counterclockwise with respect to of the welding proceeding direction, as shown by the dotted line. On the contrary, if the quantity of light impinged on the right-hand portion of the light receiving elements 14 is small, the sensor 3 should be rotated clockwise with respect to the welding proceeding direction.

Figure 9:
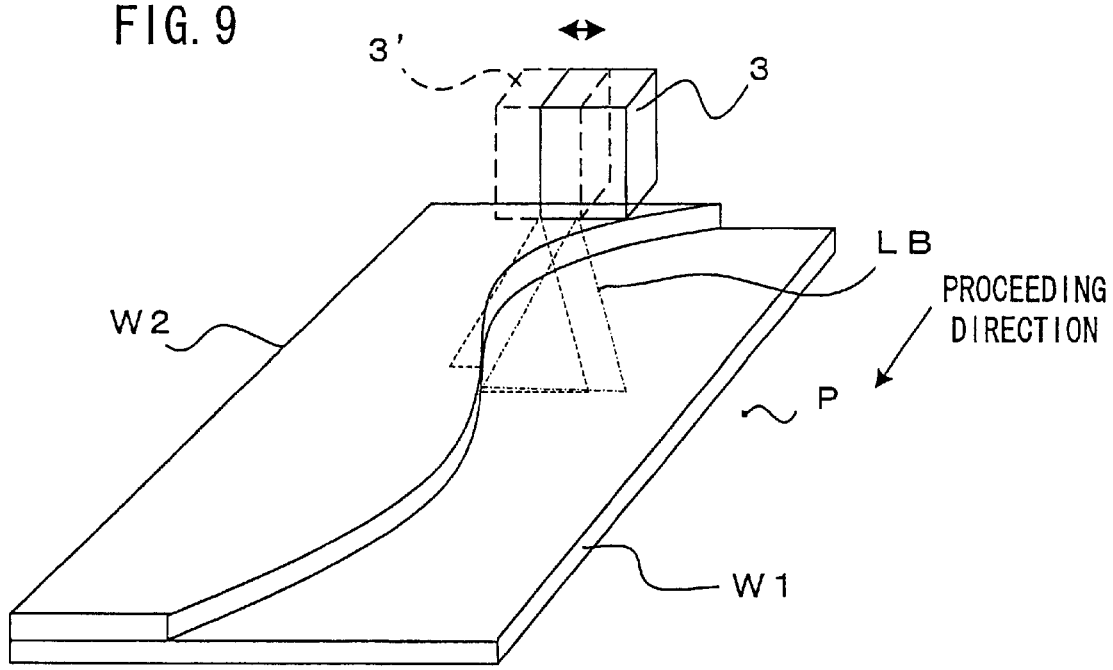
FIG. 9 is a schematic view showing a detection failure because of displacement of the sensor with respect to the welding line on a workpiece.

FIG. 9 shows a case where the welding line can not detected because the welding line is displaced from the direction of motion of the sensor 3 to be scarcely detected at a peripheral portion of the light receiving elements 14. In FIG. 9, when the workpieces W1 and W2 are rotated about a point P, the position of the welding line is scarcely recognized at the periphery of the visual field of the light receiving elements 14 and the position detector fails in detecting the welding line. In such case, the sensor 3 should be moved so that the welding line is recognized at the center of the visual field of the sensor 3.

Specifically, in the case where the welding line is scarcely recognized at the right-hand periphery of the visual field of the sensor 3 in the welding proceeding direction by scanning of the laser beam LB, the sensor 3 should be moved in the right-hand direction with respect to the welding proceeding direction, as shown by the dotted line, and in the case where the welding line is scarcely recognized at the left-hand periphery of the visual field of the sensor 3, the sensor should be moved in the left-hand direction, so that the welding line is recognized at the center of the visual field of the sensor 3.

Figure 10:
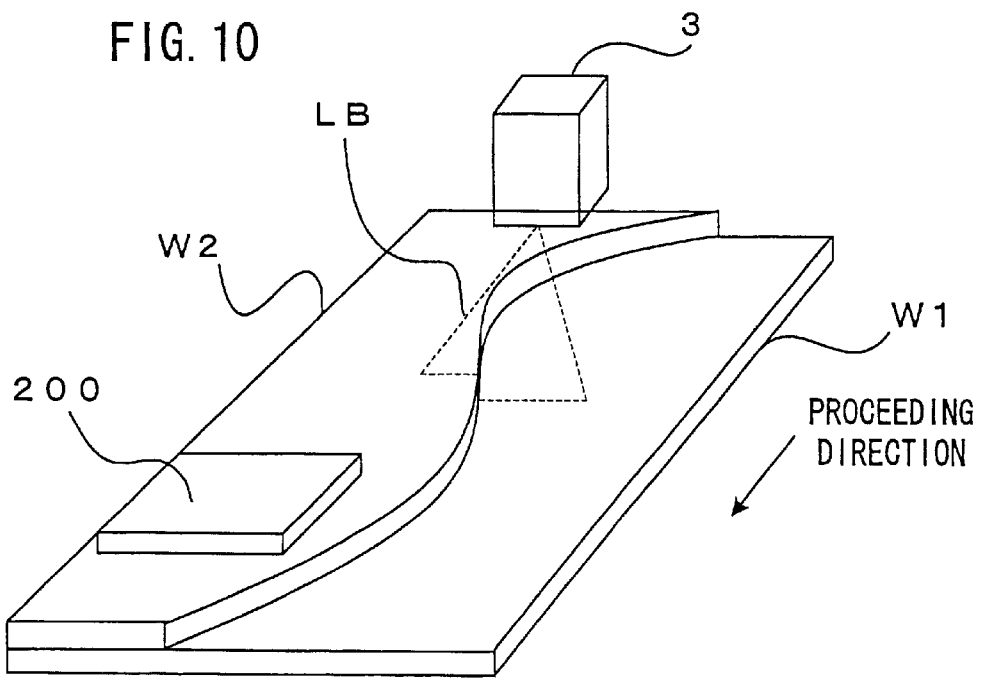
FIG. 10 is a schematic view showing a detection failure because of an additional element on a workpiece.

FIG. 10 shows a case where a detection error occurs because of variation of shape of the object of operation in the welding proceeding direction. The welding line between the workpiecs W1 and W2 is detected as a recession line formed by a notch between the two workpieces, and there is a case where two or more such recession lines are detected in the middle of the detection because of shape variations of the workpiece 2 in the welding proceeding direction caused by an unexpected object 200 such as a part attached to the workpiece or a foreign matter affixed on the workpiece. In these cases, a detection error may occur because the position detector detects two or more recession lines having possibility of being the welding line.

Such detection error is coped with by moving the sensor 3 no to detect the recession line cause by the unexpected object 200 in the same manner as shown in FIG. 9. Alternatively, the visual field of the sensor 3 is changed to avoid detection of the recession line cause by the unexpected object 200. Further, an algorithm for detecting the operation line may be changed for eliminate such a detection error.

In this embodiment, an additional program using an algorithm for detecting the welding line which is different from the algorithm of the preset program for detecting the welding line is stored in the memory 55 so as to cope with shape variations of workpiece, and the preset and currently used welding line detection program is changed or reset to the additional program using the different detection algorithm when the detection error of the above type occurs and the detection of the welding line is attempted using the changed or reset welding line detection algorithm. In the example shown in FIG. 10, a welding line detection program using an algorithm for detecting one notch on the object of detection and another welding line detection program using an algorithm for detecting two notches are prepared and stored in the memory 55. Initially, the tracking operation is started using the detection program using the algorithm for detecting one notch and when a detection error occurs in the middle of the tracking operation because of detection of two notches, the preset detection program is changed to the another detection program using the algorithm for detecting two notches to perform the welding line detection.

The above-described causes are main causes of the detection error. Conventionally, a countermeasure for the detection error is taken by an operator manually. According to the present invention, a countermeasure for the detection error is taken automatically in accordance with the cause of the detection error to carry out the detection again and if the welding line is successfully detected, the operation of the robot is continued with tracking of the welding line.

Figure 4:
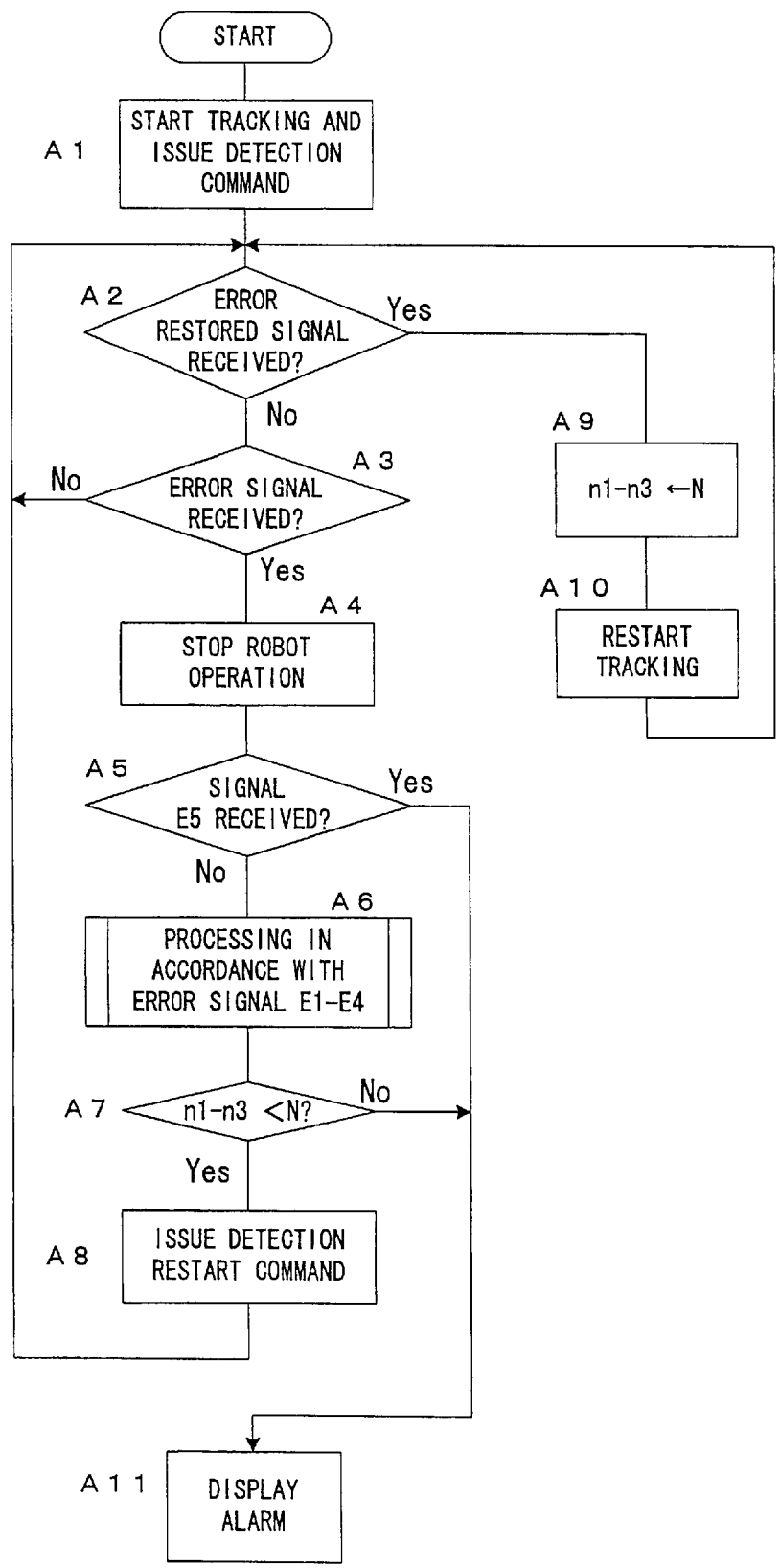
FIG. 4 is a flowchart of error-restoration processing to be performed by a CPU of the robot controller shown in FIG. 2.
Figure 5:
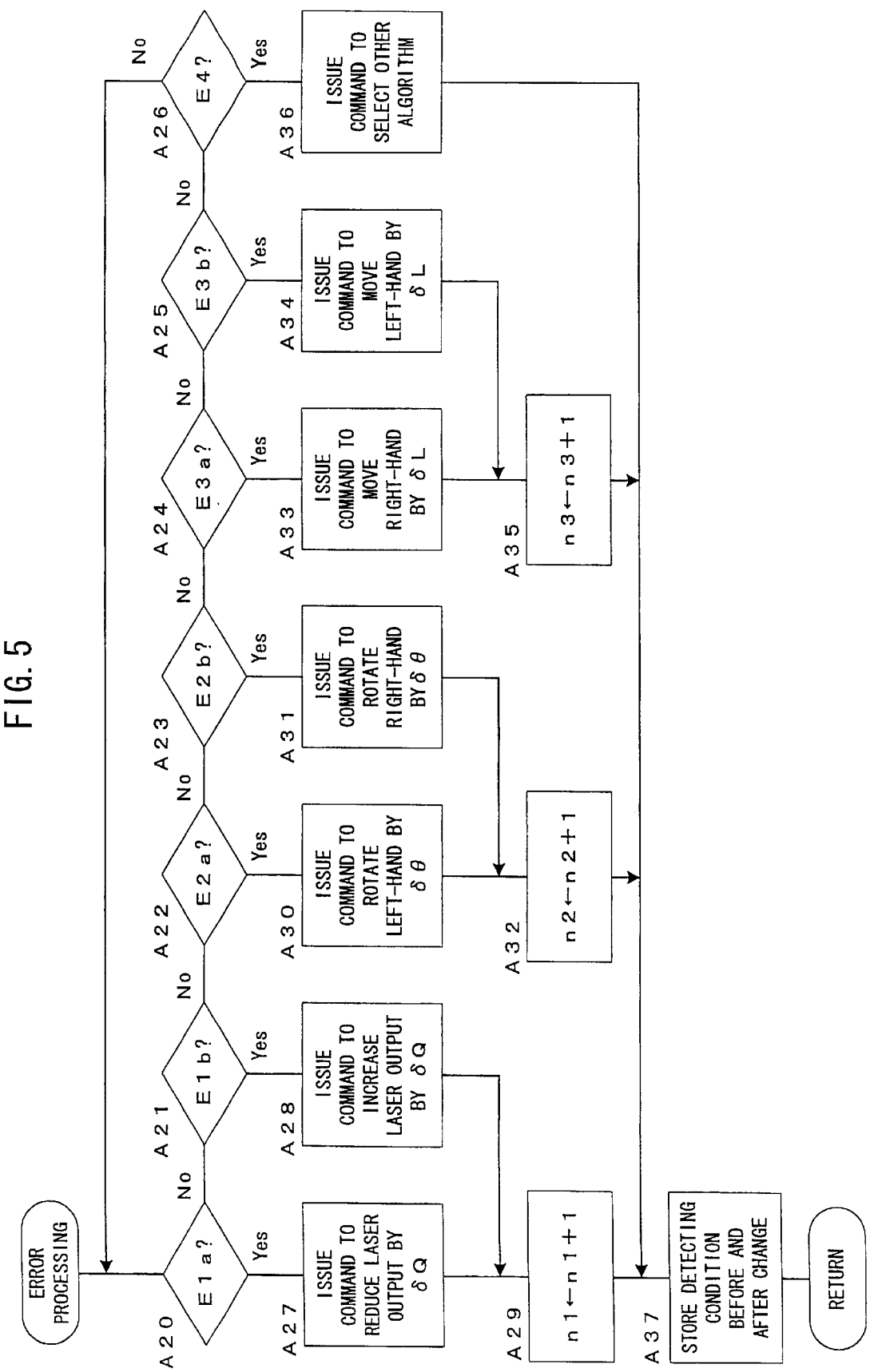
FIG. 5 is a flowchart of detecting condition changing processing as a subroutine in the flowchart of FIG. 4.

FIGS. 4 to 5 show automatic restoring processing to be executed by the CPU 41 of the robot controller 4 when a detection error occurs, and welding line detection processing to be executed by the CPU 51 on the sensor board 5. In the processing shown in FIGS. 4 to 6, causes of the excessive or too small quantity of the impinged light, the bias of the quantity of the impinged light, the bias of the detected position and the shape variations of a workpiece are determined as typical causes of the detection error and the restoring processing is automatically performed by changing or reset the detecting conditions. The automatic restoring processing may be carried out only for the cause of the most frequent error in accordance with a kind of operation and conditions of the workpieces.

Figure 6:
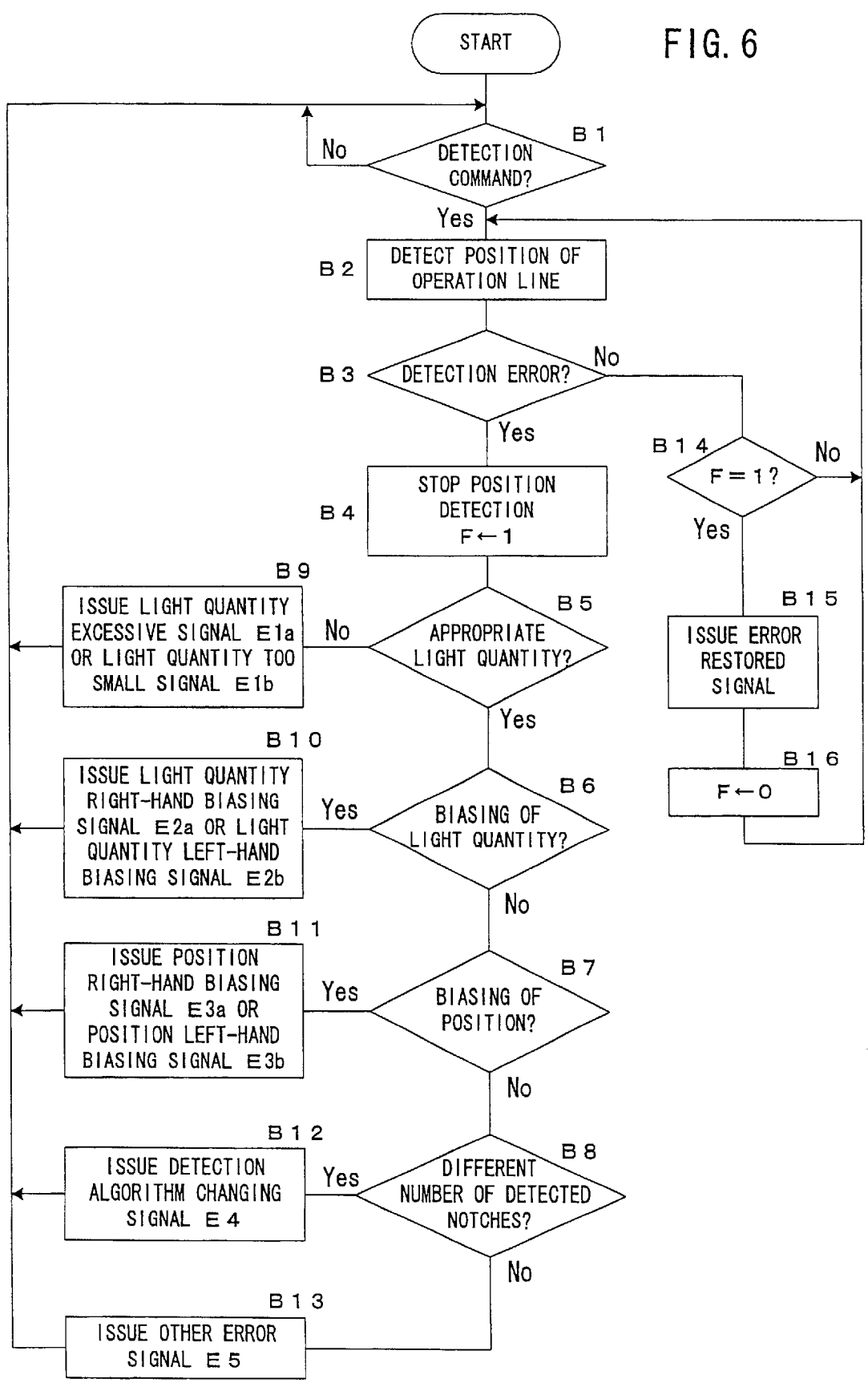
FIG. 6 is a flowchart of welding line detection processing to be executed by the CPU on the sensor board shown in FIG. 3.

The flowchart of FIG. 4 shows the error restoring processing to be executed by the CPU 41 of the robot controller 4 and the flowchart of FIG. 5 shows processing to be executed by the CPU 41 of the robot controller 4 in response to an error signal, and the flowchart of FIG. 6 shows welding line detection processing to be executed by the CPU 51 of the sensor board 5.

The CPU 41 of the robot controller reads a taught operation program in response to a welding start command, and actuates the welding torch 2 by outputting a power-supply condition signal to the power supply 6 of the welding torch 2. The CPU 41 starts a tracking operation by correcting the motion commands read out from an operation program based on the data of the position of the welding line transmitted from the sensor board 5 and outputting the corrected motion command to the axes controllers 45. The CPU 41further issues a welding line detection command to the CPU 51 of the sensor board 5 (Step A1) and repeatedly determines whether an error restoring signal from the sensor board 5 is received or not (Steps A2) and whether an error signal from the sensor board 5 is received or not (Step A3).

On the other hand, the CPU 51 of the sensor board 5 starts a laser sensor driving program stored in the memory 55 to issue a laser driving command to the laser driving section 52 and a mirror scanning command to the mirror actuating section 53 upon receipt of the welding line detection command from the CPU 41 of the robot controller 4 (Step B1).

Thus, the laser beam LB scans the workpieces W1 and W2 to detect the welding line (Step B2). The laser beam LB diffusely reflected on the workpieces W1 and W2 forms an image on the light receiving elements .14 in accordance with a position of the reflection.

The light impinged on the light-receiving elements 14 is converted into photo electrons and stored in the cells 14-1 to 14-N. The electric charge stored in the cells 14-1 to 14-N are outputted in series from one end to the other end in accordance with a CCD scanning signal at every predetermined period, and this signal is subjected to an A/D conversion through the signal detection section 54 and the input/output device 56 and stored in the memory 55. The CPU 51 computes the position of the welding line based on values of outputs from the cells 14-1 to 14-N stored in the memory 55 and the corresponding scanning angle of the laser beam LB. In this computation, in the case where a welding line is not detected (Step B3), the welding line detection is stopped and a flag F indicating an error state is set to "1" (Step B4) and an error signal indicating a cause of the detection error is issued to the robot controller 4.

Specifically, the CPU 51 observes the detection state of the welding line and if the quantity of light impinged on the cells 14-1 to 14-N are excessive to cause a halation to fail in detecting the welding line, a light quantity excessive signal E1a is issued. In the case where the impinged light is too small to detect the welding line, a light quantity too small signal E1b is issued (Steps B5 and B9). Then, procedure returns to Step B1.

In the case where the quantity of light impinged on the respective cells 14-1 to 14-N is biased to fail in detecting the welding line (Step B6), if the bias of the impinged light is directed to the right hand with respect to a moving direction of the sensor 3 and the quantity of light impinged on the left-hand cells is quite small, a light quantity right-hand biasing signal E2a is issued. On the contrary, if the quantity of light impinged on the left-hand cells is quite small, a light quantity left-hand biasing signal E3b is issued (Step B 11) and the procedure returns to Step B1.

In the case where the welding line is scarcely detected because the welding line positions at the periphery of the scanning region of the laser beam LB (Step B7), if the welding line positions at the right-hand periphery of the scanning region of the laser beam LB, a position right-hand biasing signal E3a is outputted, and if the welding line positions at the left-hand periphery of the scanning region of the laser beam LB, a position left-hand biasing signal E3b is outputted (Step B11), and the procedure returns to Step B1.

In the case where the number of the detected notches is changed in the middle of the welding line detection and the position detector fails in specifying the welding line to cause a detection error, as in the case shown in FIG. 10, the algorithm for detecting the welding line has to be changed to another one. In the example of FIG. 10, the welding line detection is started with a welding line detection program using an algorithm for specifying a welding line from one detected notch. In the case where two notches are detected in the detection of the welding line to fail in specifying the welding line, it is necessary to switch over the currently used detection program to another one using an algorithm for detecting a welding line from two notches. In such case, a signal E4 for changing the welding line detection program is issued to the CPU 41 of the robot controller 4 (Step B8, B12), and the procedure returns to Step B1.

In the case where a detection error causes with an appropriate quantity of the impinged light, no biases of the quantity and the position of the impinged light and no changes of the number of detected notches, an error signal E5 indicating the other cause is issued (Step B13), and the procedure returns to Step B1.

Referring to FIG. 4 again, the CPU 41 of the robot controller 4 determines whether or not an error restoring signal is received and whether or not an error signal is received from the CPU 51 of the sensor board 5 (Steps A2, A3). When an error signal is received, the CPU 41 stops the robot operation (Step A4) and determines whether or not the received error signal is the other error signal E5 and if the received signal is the other error signal E5, the CPU 41 issues an alarm signal for indicating an alarm by a lamp or a buzzer on the teaching operation panel 48 or a display on the liquid crystal display 47, since any countermeasure for this type of detection error is not prepared (Step A11). In this case, the display on the liquid crystal display 47 indicates the detection error occurs because of the other cause.

In the case where the received error signal is not the error signal E5, the automatic restoration processing shown as a subroutine of FIG. 5 is executed for each error signal (Step A6).

Referring to FIG. 5, first, it is determined whether or not the error signal is the light quantity excessive signal E1$a$, the light quantity too small signal E1$b$, the light quantity right-hand biasing signal E2$a$, the light quantity left-hand biasing signal E2$b$, the position right-and biasing signal E3$a$, the position left-hand biasing signal E3$b$ or the detection algorithm changing signal E4 (Steps A20–A26).

If it is determined that the error signal is the light quantity excessive signal E1$a$ in Step A20, the CPU 41 sends a new laser output command designating a laser output intensity reduced by a predetermined value $\delta Q$ with respect to the present laser output intensity designated by the present laser output command (Step A27) to the CPU 51, and the counter n1 counting the number of the changes of the laser output command is increased by "1" in Step A29. Further, the detecting conditions including the laser output intensity, an orientation of the sensor, a position of the sensor and the detection algorithm before and after the change of the detecting conditions, an error information, i.e. detection failure information and a stopped position of the robot are stored in the nonvolatile memory 44 in Step A37. In the above case, different information on the laser output intensity is stored and the same information on the other detecting conditions are stored as the data before and after the detecting condition change. Then, the procedure returns to Step A7 in the main routine shown in FIG. 4. The value of the counter n1 and counters n2 and n3, as described later, are set to "0" at an initial setting when the power of the sensor board 5 is turned on.

When it is determined that light quantity too small signal E1$b$ is received in Step A21, a new laser output command is sent to the CPU 51 with the laser output intensity increased by a predetermined value $\delta Q$ with respect to the present laser output intensity designated by the present laser output command in Step A28, the counter n1 is increased by "1" in Step A29, and the processing of Step A37 is carried out, to return the main routine.

Although not shown in the flowchart of FIG. 6, the CPU 51 on the sensor board 5 stores the laser output command in the memory 55 and drives the laser driving section 52 based on the new laser output command when restarting the welding line detection operation.

When it is determined that light quantity right-hand biasing signal E2$a$ is received in Step A22, it is presumed that the orientation of the laser sensor 3 is inclined to right-hand with respect to the moving direction of the laser sensor 3 since the quantity of the impinged light from the left-hand region of the scanning region is small. Thus, the robot axes are driven such that the orientation of the laser sensor 3 is inclined to left-hand by a predetermined value $\delta\theta$ in Step A30. Contrary, when it is determined that light quantity left-hand biasing signal E2$b$ is received in Step A23, the robot axes are driven such that the orientation of the laser sensor 3 is inclined to right-hand by a predetermined value $\delta\theta$ in Step A31. Then, the value of the counter n2 counting the number of the adjustments of the orientation of the laser sensor 3 is increased by "1" in Step A32, and the procedure proceeds to Step A37 where the detecting conditions before and after the detecting condition change are stored in the nonvolatile memory 44.

When it is determined that the position right-hand biasing signal E3$a$ is received in Step A24, the respective axes of the robot are driven such that the position of the laser sensor 3 is moved to right-hand with respect to the moving direction of the sensor 3 by the predetermined value $\delta L$ in Step A33, since an unclear but possible welding line is detected at the right-hand end of the scanning region of the laser beam LB. Contrary, it is determined that the position left-hand biasing signal E3$b$ is received in Step A25, the laser sensor 3 is moved to left-hand with respect to the moving direction of the sensor 3 by the predetermined value $\delta L$ in Step A34. Then, the value of the counter n3 counting the number of the adjustments of the position of the laser sensor 3 is increased by "1" in Step A35, and the procedure proceeds to Step A37.

When it is determined that the error signal is the detection algorithm changing signal E4 in Step A26, a command for selecting the other detecting algorithm is issued to the CPU 51 on the sensor board 5 in Step A36 and the procedure proceeds to Step A37. The CPU 51 on the sensor board 5 stores the detection algorithm changing command in the memory 55 and selects the welding line detecting program in accordance with the detection algorithm changing command when restarting the welding line detection operation.

After executing the processing of Step A37, the procedure returns to the main routine shown in FIG. 4 and the CPU 41 determines whether or not the values of the counters n1–3 are smaller than the set value N in Step A7. If the values of the counters n1–3 are smaller than the set value N in Step A7, a welding line detection restart command is issued to the CPU 51 on the sensor board 5 in Step A8, and the procedure returns to Step A2.

As shown in FIG. 6, when the CPU 51 on the sensor board 5 determines the receipt of the welding line detection restart command in Step B1, the welding line detection processing of Step B2 is started. In this processing, the laser driving section 52 is driven based on the renewed and stored laser output command so that the output of the laser oscillator 11 is changed to be of the value designated by the new laser output command. Also, in the case where the detection algorithm changing command has been issued, the detection algorithm is changed to the other one designated by the detection algorithm changing command.

In the welding line detection processing, when it is determined that a detection error occurs in Step B3, the processing of Step B4 and the subsequent steps are executed. When it is determined that no error occurs in Step B3, it is determined whether the flag F1 is "1" or not. If the flag F1 is "1", it means that the processing is the first welding line detection processing after restoring the detection error and thus a detection error restored signal is issued to the CPU 41 of the robot controller 4 in Step B15 and the flag F is set to "0" in Step B16, and the procedure returns to Step B2. Since the flag F has been set to "0" in Step B16, the processing of Steps B2, B3 and B14 is repeatedly executed to continue the welding line detection processing.

On the other hand, when it is determined that the detection error restored signal is received in Step A2, the CPU 41 of the robot controller 4 clears the counters n1–n3 in Step A2 and restarts the robot to perform the welding line tracking operation in Step A10, which has been suspended by the error signal, and the procedure returns to Step A2. In the welding line tracking operation, when the detection error signal is received, the processing of Step A4 and the subsequent Steps is performed. In the restarting of the welding line tracking operation, the welding line tracking operation may be restarted from the position where the welding operation and the robot operation are stopped. It is preferable to restart the welding line tracking operation at a position backward by a predetermined distance along the welding line from the position where the welding operation is stopped. Particularly, if the welding operation is restarted from the position where the welding operation is stopped due to the welding line detection error, an undesirable junction may be produced at that position.

As described above, when a welding line detection error occurs in the welding line tracking operation, the detection error restoring processing is automatically performed in accordance with the cause of the detection error, as long as the cause of the detection error is predicted and the countermeasure is prepared. If it is determined that the values of the counters n1–n3 increased in Steps A29, A32 and A35 exceed the set value in Step A8, i.e., the detection error is not restored by the N number of error restoring processes, an alarm is issued in Step A11. The alarm is displayed on the liquid crystal display 47 indicating the cause of the detection error in accordance with the error signals E1$a$, E1$b$, E2$a$, E2$b$, E3$a$, E3$b$, E5. Specifically, indications such as "light quantity excessive", "light quantity too small", "light beam right-hand biasing", "light beam left-hand biasing", "position right-hand biasing", "position left-hand biasing" and "the other error" is displayed on the liquid crystal display 47. Further, the position of the robot stoppage, the information on the detection failure, and the detecting conditions before and after the detecting condition change may be displayed on the liquid crystal display 47 by operating the teaching operation panel 48 for analyzing the cause of the detection failure.

In the foregoing embodiment, the detection algorithm is changed when an additional possible line is detected because of the unexpected object 200. Alternatively, the position and/or visual field of the sensor may be changed so that the unexpected object 200 is not detected by the sensor.

According to the method of restoring such detection error by changing the position of the sensor, the processing of Step B12 is replaced by the processing similar to the processing of Step B11 to issue the position biasing signal when it is determined that the unexpected object 200 is detected in Step B8. Specifically, the CPU 51 on the sensor board 5 issues a command for moving the sensor 3 in the left-hand direction to the robot controller 4 when the unexpected object 200 is detected in the right-hand region of the visual field of the sensor 3. The CPU 51 issues a command for moving the sensor 3 in the right-hand direction to the robot controller 4 when the unexpected object 200 is detected in the left-hand region of the visual field of the sensor 3. The CPU 41 of the robot controller 4 issues a command for driving the respective robot axes so that the sensor 3 is moved in the left-hand direction by the predetermined amount δL in response to the command to move the sensor 3 in the left-hand direction, and issues a command for driving the respective robot axes so that the sensor 3 is moved in the right-hand direction by the predetermined quantity δL in response to the command to move the sensor 3 in the right-hand direction, in place of the processing of Steps A 26 and A36, and then increases the value of an additional counter. Alternatively, the right-hand and left-hand position biasing signals E3$a$ and E3$b$ to be issued in Step B11 may be used as the above commands to move the sensor in the right-hand direction and in the left-hand direction, respectively, so that the robot controller 4 executes the processing of Steps A24, A 33, A25, A34 and A35.

According to the method of restoring the above detection error by changing the visual field of the sensor 3, the processing of Step B12 is replaced by processing to issue a command for changing a range of the visual field of the sensor 3 to the robot controller 4 when it is determined that the number of the detected lines are changed in Step B8. The robot controller 4 issues a command for changing the range of the visual field of the sensor 3 by reducing the scanning angle of the scanning mirror 12 by a predetermined angle δθ in place of the processing of Step A36 to issue a command for changing the detection algorithm, when the command for changing the range of the visual field of the sensor 3 is received in Step A26 instead of the detection algorithm changing command. Then, the additional counter is increased by "1" and the procedure proceeds to Step A37.

The CPU 51 on the sensor board 5 issues a command for driving the scanning mirror 12 in accordance with the altered scanning angle. Thus, the detection range of the visual sensor 3 is reduced. By repeatedly performing the above processing to reduce the detection range of the visual sensor 3 gradually, the unexpected object 200 comes out of the visual field of the visual sensor 3 so that the welding line is detected precisely. If the counter reaches the set number N to fail in the welding line, the processing proceeds from Step A7 to Step A11.

Further, the visual field of the visual sensor 3 may be changed by displacing the scanning range of the scanning mirror 12 to scan a range displaced in a direction remote from the direction where the unexpected object 200 is detected, alternatively of reducing the scanning range of the scanning mirror 12.

If the detection error due to the increase of the numbers of the detected lines is not restored by the above changes of the position of the sensor or the changes of the visual field of the predetermined N times, the laser sensor 3 may returned to the original stopped position or the initial visual range, and the change of the detection algorithm may be performed by the processing of Steps B12, A26 and A36.

In the foregoing embodiments, when a detection error occurs, a detection error signal indicating the cause of the detection error is issued from the CPU 51 on the sensor board 5 to the CPU 41 of the robot controller 4 to take a countermeasure for the cause of the detection error. However, detection errors for some causes can be restored by the CPU 51 on the sensor board 5. In the foregoing embodiments, countermeasures of the adjustment of the laser output against the causes of the excessive light quantity or too small light quantity, alternation of welding line detection program against the change of the numbers of the detected lines can be taken by the CPU 51 on the sensor board 5. The errors which can be treated by the CPU 51 may be restored by the position detector, and the error signal indicating occurrence of the error is sent to the robot controller 4 to stop the tracking operation of the robot.

Further, in the foregoing embodiment, the number of the adjustments of the impinged light quantity, the impinged light biasing, the position of the sensor are counted by the counters ni1, n2 and n3, respectively. Alternatively, the total number of the adjustments for restoring the detection error may be counted by a single counter.

In the foregoing embodiment, the detection algorithm for detecting a welding line form a single notch and the detection algorithm for detecting a welding line form two notches are prepared and stored in the memory 55 to select either of the two algorithms. A plurality of welding line detection programs using different algorithms for detecting the welding line may be prepared and stored in the memory 55 in accordance with predicted shapes of the workpieces on which a welding line is formed. When a detection error due to the change of the numbers of the detected notches occurs with the detection algorithm presently selected, the welding line detection programs of different detection algorithms may be successively selected and executed.

According to the present invention, the detecting condition for detecting an operation line is automatically changed or reset when a detection error occurs in a tracking operation of the robot, and the tracking operation is automatically restarted with the changed or reset detecting condition if the detection error is restored under the change or reset detection condition. Thus, the tracking operation of the robot operation due to the detection failure of the operation line is automatically recovered without operator's manual operation, to enhance the efficiency of the automatic robot operation.

What is claimed is:

1. An operation line tracking device for a robot to perform an operation with a tool mounted on the robot while moving the tool along an operation line formed on an object of operation, said device comprising:

a detector to detect a position of the operation line, said detector detecting the position of the line by using a sensor mounted on the robot;

detecting condition information according to which the detector detects the operation line;

observing means to observe a detection state of said device detecting the operation line with said detector; and detecting condition changing means to automatically adapt said detecting condition information in accordance with the detection state observed by said observing means, said detector further detecting the line according to the adapted detecting condition information.

2. A tracking device for a robot according to claim 1, further comprising a display device for displaying an alarm message when said detector fails in detecting the operation line for a predetermined time or times under the changed or reset detecting condition.

3. The device according to claim 1, wherein the detecting condition information comprises at least one of detector position information, detector orientation information, and detector algorithm information.

4. An operation line tracking device for a robot to perform an operation with a tool mounted on the robot while moving the tool along an operation line formed on an object of operation, said device comprising:

a detector to detect a position of the operation line using a sensor mounted on said robot under a preset detecting condition;

operation stopping means to stop the operation of the robot and the detection of the operation line by said detector when said detector fails to detect the operation line;

detecting condition changing means to change or reset the preset detecting condition of said detector after the detection of the operation line is stopped; and operation restarting means to restart the detection of the operation line under the changed or reset detecting condition, and restart the operation of the robot when said detector succeeds in detecting the operation line under the changed or reset detecting condition.

5. An operation line tracking device for a robot according to claim 4, wherein the sensor of said detector comprises a laser sensor operating under a preset laser output intensity, said detecting condition changing means changes or resets the preset laser output intensity of said laser sensor.

6. An operation line tracking device for a robot according to claim 4, wherein said detecting condition changing means changes or resets a detecting orientation and/or a detecting position of said sensor with respect to the object of operation.

7. An operation line tracking device for a robot according to claim 4, wherein said detector detects a position of the operation line using a preset operation line detection program, and said detecting condition changing means changes or resets the preset operation line detection program for another operation line detection program.

8. An operation line tracking device for a robot according to claim 7, wherein said detecting condition changing means has a memory storing operation line detection program s with different detection algorithms, and selects one of the operation line detection programs as the preset operation line detecting condition and selects an operation line detection program other than the preset operation line detection program after the detection of the operation line is stopped.

9. An operation line tracking device for a robot according to claim 4, wherein said sensor of said detector comprises a visual sensor for sensing an image of the object of operation within a preset visual field and said detecting condition changing means changes or resets the preset visual field of said visual sensor.

10. An operation line tracking device for a robot according to claim 9, wherein said sensor has a laser beam scanner for scanning a preset scanning region on the object of operation, said detecting condition changing means changes or resets the visual field by changing the preset scanning region.

11. A tracking device for a robot according to claim 4, wherein said operation restarting means sets a restarting position of the operation of the robot to a position different form the stopped position of the operation of the robot.

12. A tracking device for a robot according to claim 4, further comprising a display device for displaying an alarm message when said detector fails in detecting the operation line for a predetermined time or times under the changed or reset detecting condition.

13. A tracking device for a robot according to claim 12, further comprising storage means for storing at least one of information on the occurrence of the detection failure, the stop position of the operation of the robot, the detecting conditions before and after the changing or resetting of the detecting condition when the detection of the operation line is restarted, wherein the information stored in said memory is displayed on said display device.

14. An operation line tracking device for a robot to perform an operation with a tool mounted on the robot while moving the tool along an operation line formed on an object of operation, said device comprising:

a detector to detect a position of the operation line, said detector detecting the position of the line by using a sensor and detecting according to detecting condition information;

analyzing means to analyze a cause of a detection failure when said detector fails in detecting the operation line by using the sensor; and detecting condition changing means to automatically adapt the detecting condition information in accordance with the cause of the detection failure analyzed by said analyzing means, said detector further detecting the line according to the adapted detecting condition information.

15. A tracking device for a robot according to claim 14, further comprising a display device for displaying an alarm message when said detector fails in detecting the operation line for a predetermined time or times under the changed or reset detecting condition.

16. The device according to claim 14, wherein the detecting condition information comprises at least one of detector position information, detector orientation information, and detector algorithm information.

17. An operation line tracking device for a robot to perform an operation with a tool mounted on the robot while moving the tool along an operation line formed on an object of operation, said device comprising:

a detector to detect a position of the operation line with a sensor under a preset detecting condition;

operation stopping means to stop the robot operation and the detection of the operation line when said detector fails in detecting the operation line;

analyzing means to analyze a cause of the detection failure;

detecting condition changing means to change or reset the preset detecting condition in accordance with the cause of the detection failure analyzed by said analyzing means; and operation restarting means to restart the detection of the operation line with the changed or reset detecting condition and restart the operation of the robot when said detector succeeds in detecting the operation line under the changed or reset detecting condition.

18. A tracking device for a robot according to claim 17, wherein said operation restarting means sets a restarting position of the operation of the robot to a position different from the stopped position of the operation of the robot.

19. A tracking device for a robot according to claim 17, further comprising a display device wherein said detecting condition changing means make display an alarm message when said detector fails in detecting the operation line for a predetermined time or times under the changed or reset detecting condition on said display device.

20. A tracking device for a robot according to claim 19, further comprising storage means for storing at least one of information on the occurrence of the detection failure, the stop position of the operation of the robot, the detecting conditions before and after the changing or resetting of the detecting condition when the detection of the operation line is restarted, wherein the information stored in said memory is displayed on said display device.

21. An operation line tracking device for a robot to perform an operation with a tool mounted on the robot while moving the tool along an operation line formed on an object of operation, said device comprising:

a detector detecting a position of the operation line using a sensor mounted on said robot under a preset detecting condition;

an operation stopping unit stopping the operation of the robot and the detection of the operation line by said detector when said detector fails to detect the operation line;

a detecting condition changing unit changing or resetting the preset detecting condition of said detector after the detection of the operation line is stopped; and an operation restarting unit restarting the detection of the operation line under the changed or reset detecting condition, and restarting the operation of the robot when said detector succeeds in detecting the operation line under the changed or reset detecting condition.

22. An operation line tracking device for a robot to perform an operation with a tool mounted on the robot while moving the tool along an operation line formed on an object of operation, said device comprising:

a detector detecting a position of the operation line with a sensor under a preset detecting condition;

an operation stopping unit stopping the robot operation and the detection of the operation line when said detector fails in detecting the operation line;

an analyzing unit analyzing a cause of the detection failure;

a detecting condition changing unit changing or resetting the preset detecting condition in accordance with the cause of the detection failure analyzed by said analyzing unit; and an operation restarting unit restarting the detection of the operation line with the changed or reset detecting condition and restarting the operation of the robot when said detector succeeds in detecting the operation line under the changed or reset detecting condition.

23. An operation line tracking method for a robot to perform an operation with a tool mounted on the robot while moving the tool along an operation line formed on an object of operation, said method comprising:

detecting a position of the operation line using a sensor mounted on said robot under a preset detecting condition;

stopping the operation of the robot and the detection of the operation line when said detecting fails to detect the operation line;

automatically changing or resetting the preset detecting condition after the detection of the operation line is stopped; and restarting the detection of the operation line under the changed or reset detecting condition, and restarting the operation of the robot when said detecting succeeds in detecting the operation line under the changed or reset detecting condition.

24. An operation line tracking method for a robot to perform an operation with a tool mounted on the robot while moving the tool along an operation line formed on an object of operation, said method comprising:

detecting a position of the operation line with a sensor under a preset detecting condition;

stopping the robot operation and the detection of the operation line when said detecting fails in detecting the operation line;

analyzing a cause of the detection failure;

automatically changing or resetting the preset detecting condition in accordance with the cause of the detection failure analyzed by said analyzing; and restarting the detection of the operation line with the changed or reset detecting condition and restarting the operation of the robot when said detector succeeds in detecting the operation line under the changed or reset detecting condition.

25. An operation line tracking device for a robot to perform an operation with a tool mounted on the robot while moving the tool along an operation line formed on an object of operation, said device comprising:

a detector detecting a position of the operation line, said detector detecting the position of the line by using a sensor mounted on the robot;

detecting condition information according to which the detector detects the operation line;

an observing unit observing a detection state of said device detecting the operation line with said detector; and a detecting condition changing unit automatically adapting said detecting condition information in accordance with the detection state observed by said observing unit, said detector further detecting the line according to the adapted detecting condition information.

26. An operation line tracking device for a robot to perform an operation with a tool mounted on the robot while moving the tool along an operation line formed on an object of operation, said device comprising:

a detector detecting a position of the operation line, said detector detecting the position of the line by using a sensor and detecting according to detecting condition information;

an analyzing unit analyzing a cause of a detection failure when said detector fails in detecting the operation line by using the sensor; and a detecting condition changing unit automatically adapting the detecting condition information in accordance with the cause of the detection failure analyzed by said analyzing means, said detector further detecting the line according to the adapted detecting condition information.

27. An operation line tracking method for a robot to perform an operation with a tool mounted on the robot while moving the tool along an operation line formed on an object of operation, said method comprising:

detecting a position of the operation line by using a sensor mounted on the robot and according to detecting condition information;

observing a state of said detecting the operation line; and automatically adapting said detecting condition information in accordance with the observed detecting state, and further detecting the line according to the adapted detecting condition information.

28. An operation line tracking method for a robot to perform an operation with a tool mounted on the robot while moving the tool along an operation line formed on an object of operation, said method comprising:

detecting a position of the operation line by using a sensor and detecting according to detecting condition information;

analyzing a cause of a detection failure when said detecting fails to detect the operation line; and automatically adapting the detecting condition information in accordance with the cause of the analyzed detection failure, and further detecting the line according to the adapted detecting condition information.

29. A method, comprising:

failing to automatically detect a robotic tracking line on a surface as a result of a change to a physical stimulus being electronically sensed; and automatically adapting the automatic detecting of the robotic tracking line responsive to the changed physical stimulus.

30. A method, comprising:

failing to automatically detect a robotic tracking line on a surface as a result of a change in a physical condition that changes a physical stimulus being electronically sensed, the changed physical condition comprising at least a changed arrangement of the surface, a changed reflectivity of the surface, or any other changed physical condition that alters the physical stimulus; and successfully automatically detecting the operation line by automatically adapting the automatic detecting responsive to electronically sensing the changed physical stimulus.

* * * * *

UNITED STATES PATENT AND TRADEMARK OFFICE
CERTIFICATE OF CORRECTION

PATENT NO.    : 6,445,979 B1
DATED         : September 3, 2002
INVENTOR(S)   : Toshihiko Inoue et al.

It is certified that error appears in the above-identified patent and that said Letters Patent is hereby corrected as shown below:

<u>Title page,</u>
Item [56], References Cited, FOREIGN PATENT DOCUMENTS, insert the following FOREIGN PATENTS, -- 8-57647          03-1996     JP     Terawaki et al. --
-- JP361011808A     01-1986     JP     Kishi et al. --

Signed and Sealed this

Seventh Day of January, 2003

JAMES E. ROGAN
*Director of the United States Patent and Trademark Office*